United States Patent Office 2,738,369
Patented Mar. 13, 1956

2,738,369

METHOD FOR MAKING QUATERNARY AMMONIUM BOROHYDRIDES

Mario D. Banus, Ipswich, and Thomas R. P. Gibb, Jr., and Robert W. Bragdon, Marblehead, Mass., assignors, by mesne assignments, to the United States of America as represented by the United States Atomic Energy Commission No Drawing. Application June 6, 1951,
Serial No. 230,264

18 Claims. (Cl. 260—567.6)

The invention described herein may be manufactured and used by or for the Government for governmental purposes without the payment of any royalty thereon.

This invention relates to quaternary ammonium borohydrides, such as tetramethyl ammonium borohydride, and to methods for preparing these borohydrides.

The alkali metal borohydrides, such as sodium, lithium, potassium borohydride, are powerful reducing agents and may be used in a variety of solvents for rapidly reducing a great variety of chemical compounds at low or moderate temperatures. Thus, sodium borohydride may be employed for this purpose in aqueous solutions as well as in other polar solvents, such as alcohols and primary and secondary amines and derivatives of such amines containing ether linkages. Lithium borohydride may be used in these solvents as well as in many ethers in which sodium borohydride does not dissolve.

We are aware that others have studied the reaction of ammonium compounds with borohydrides. For example, George W. Schaeffer, et al. (J. Am. Chem. Soc. 71, 2143), describe the reactions in ether solution of lithium borohydride with trimethyl ammonium chloride, dimethyl ammonium chloride or monomethyl ammonium chloride to produce (1) trimethyl amine-borine, (2) N-dimethylamino-borine and (3) N-trimethyl-borazole. These reactions are represented by the following equations:

(1)
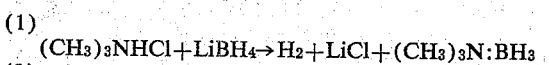
(2)
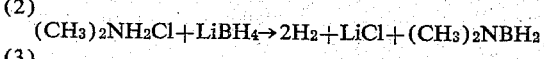
(3)
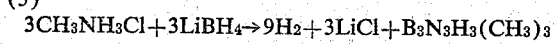

In the reactions represented by Equations 1 and 2, the products may be isolated from the reaction mixture by removal of the ether by distillation, and by subsequent sublimation, in vacuum, of the boron compound from the solid residue. At room temperature in the reaction represented by Equation 3, only part of the hydrogen expected is evolved. At this stage of the reaction, the intermediate boron-nitrogen compound is non-volatile. The solvent may be removed by distillation and, the non-volatile residue being heated to 250°, additional hydrogen is produced and N-trimethylborazole is recovered from the volatile products.

In contrast with the reactions of the monoalkyl, dialkyl and trialkyl ammonium compounds with an alkali metal borohydride in ether solution as represented by Equations 1, 2 and 3, we have discovered that certain quaternary ammonium compounds, such as tetramethyl ammonium hydroxide and tetramethyl ammonium salts of inorganic and organic acids, react metathetically with an alkali metal borohydride when associated therewith in certain polar solvents to form the quaternary ammonium borohydride and an alkali metal hydroxide or salt. The reaction may be illustrated by the equation:

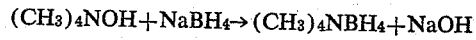

The solvent used should be a solvent for both of the reactants. One of the reaction products should be less soluble in the solvent used than either of the reactants and preferably, although not necessarily, less soluble than the other reaction product. By a quaternary ammonium borohydride we mean a compound consisting of the $BH_4$ group and a quaternary ammonium group containing four hydrocarbon radicals.

In general, the reaction takes place at a low or moderate temperature. In a given case, the temperature used is that at which the most favorable relative solubilities of the reactants and reaction products, as above mentioned, exist. It is desirable that one reaction product shall be less soluble than the other to facilitate their separation. However, this is not essential since the products may be separated in other ways, for example, by treatment of the mixture of reaction products with a solvent for one which removes it before an equilibrium may be established.

In place of the tetramethyl ammonium hydroxide or the tetramethyl ammonium salts of inorganic or organic acids, a variety of quaternary ammonium hydroxides and quaternary ammonium salts may be employed in which one or more of the methyl groups is replaced by another hydrocarbon radical, such as another alkyl radical, an alkaryl radical, etc., and which are soluble in the polar solvent for the alkali metal borohydride. As illustrative of such quaternary ammonium hydroxides or salts, we may mention tetraethyl, tetrapropyl, tetraisopropyl, tetrabutyl, butyltrimethyl, phenyltrimethyl and benzyltrimethyl ammonium chlorides, (2-cyclohexylethyl)-trimethyl ammonium iodide, allyltrimethyl ammonium chloride, (2-chloroethyl) trimethyl ammonium perchlorate, (2-hydroxybutyl)-trimethyl ammonium chloride, (2-ethoxypropyl) trimethyl ammonium bromide, alpha-amino-p-tolyl trimethyl ammonium chloride, (3-cyanopropyl) trimethyl ammonium bromide, (2-carboxyethyl) trimethyl ammonium chloride, amyldimethylphenyl ammonium iodide, etc.

Subject to the limitations previously mentioned, as illustrative solvents suitable for use in the practice of the invention, we may mention water; liquid organic amines, such as triethanolamine, trimethylamine and isopropylamine; aliphatic alcohols, such as methyl, ethyl, propyl, isopropyl and normal butyl alcohols; amides, such as formamide; nitriles, such as acetonitrile; mixtures of such solvents; etc. When water is used, it may be rendered alkaline by the addition of an alkaline material, such as a quaternary ammonium hydroxide or an alkali metal hydroxide to reduce or prevent the liberation of hydrogen by reaction with the alkali metal borohydride.

We have investigated the reactions of a large number of quaternary ammonium compounds of the type previously mentioned with an alkali metal borohydride, such as sodium and lithium borohydrides, in various polar solvents. While the metathetical reaction proceeds in any polar solvent which is a solvent for both of the reactants and in which one of the reaction products is less soluble than either of the reactants, the preferred solvents may be defined as liquids whose dielectric constant at 20° C. is about 3 or more, which are soluble in water to the extent of at least 1 per cent or more by weight, which are chemically stable in contact with 0.1 normal aqueous sodium hydroxide at 20° C. for a period of at least one hour, which are selected from the group consisting of water, organic amines, alcohols, amides, nitriles, mixtures of such liquids, and a mixture of at least one of such liquids with an inert diluent and which are solvents for both of the reactants and in which one of the reaction products is less soluble than either of the reactants.

The invention is illustrated further by the following specific examples:

*Example 1*

100 grams of a solution containing 10% of tetramethyl ammonium hydroxide in water was placed in a half liter round bottom flask and 4.2 grams of sodium borohydride of 97% purity was dissolved in the solution by stirring. The flask then was connected to a vacuum system capable of producing a vacuum of less than 1 mm. of mercury and the solution was evaporated at room temperature until a large crop of crystals was formed. These crystals were separated by filtering, washed once with water, and then vacuum dried at room temperature. The crystals weighed 4 grams and contained 94% tetramethyl ammonium borohydride. The washings and mother liquor also were similarly evaporated and vacuum dried to obtain a second crop of crystals. This batch weighed 2 grams and contained 94% tetramethyl ammonium borohydride. The tetramethyl ammonium borohydride is a white powder which is stable when heated up to about 200° C. in vacuum.

*Example 2*

The materials and amounts thereof as well as the procedure used in this run were the same as in Example 1 with the following exceptions. Ascarite tubes protected the solution at all times except when under vacuum. In this run the solution was evaporated to dryness and the solid washed with 70 cc. of 95% ethyl alcohol which is 100% in excess of that necessary to dissolve the NaOH formed. The solid product was vacuum dried at 100° C. for 15 hours. The product contained 96.4% tetramethyl ammonium borohydride with a 95% yield. The density of tetramethyl ammonium borohydride is 0.812 gram per cc. and its solubility in water at 20° C. is 48 grams per 100 grams water and its solubility in acetonitrile is 0.4 gram per 100 grams acetonitrile at room temperature.

*Example 3*

6.65 grams of tetramethyl ammonium acetate was stirred in a flask with 1.9 grams sodium borohydride and 30 cc. of distilled water. The solution was evaporated to dryness under vacuum at room temperature and then vacuum dried for 15 hours. The solid was ground with 25 cc. of 95% ethyl alcohol and then extracted with 100 cc. more of the alcohol for 4 hours. After filtering, the solid was washed with 30 cc. of the alcohol and then vacuum dried for 15 hours. A yield of 75% of tetramethyl ammonium borohydride of 86% purity was obtained.

*Example 4*

Tetramethyl ammonium fluoride was prepared by neutralization to a pH between 9 and 10 of a 10% aqueous solution of tetramethyl ammonium hydroxide with 48% hydrofluoric acid. An aqueous solution containing 2.16 grams of 97.5% lithium borohydride in about 50 cc. of water was prepared at 0° C. and was added to 80 cc. of the aqueous solution of 1.199 molar tetramethyl ammonium fluoride at room temperature. A white precipitate of lithium fluoride was filtered off. The filtrate containing tetramethyl ammonium borohydride was evaporated to dryness under vacuum at room temperature. The product obtained weighed 8.4 grams and contained 93.4% tetramethyl ammonium borohydride.

*Example 5*

Tetramethyl ammonium oxalate was prepared by neutralization of a 10% aqueous solution of tetramethyl ammonium hydroxide with oxalic acid crystals. An aqueous solution containing 0.646 gram of 98.2% lithium borohydride was prepared at 0° C. and added to 25 cc. of the aqueous 1.158 molar solution of tetramethyl ammonium oxalate. This solution was evaporated to dryness at room temperature under vacuum. The dried product was leached with 5 cc. of water and filtered. The filtrate was evaporated to dryness under vacuum with a final heating to 105° C. for 3 hours. The product obtained weighed 1.2 grams and contained 72.3% tetramethyl ammonium borohydride.

*Example 6*

Tetramethyl ammonium carbonate was prepared by bubbling $CO_2$ into a 10% aqueous solution of tetramethyl ammonium hydroxide until a phenolphthalein color was discharged and then adding an equivalent amount of tetramethyl ammonium hydroxide to convert the bicarbonate to carbonate. An aqueous solution containing 1.334 grams of 98.2% lithium borohydride was prepared by dissolving in water at 0° C. and then was added to 50 cc. of the aqueous solution of 1.15 molar tetramethyl ammonium carbonate. The mixture was evaporated under vacuum at room temperature to a volume of 20 cc. and filtered. The filtrate was evaporated to dryness under vacuum with a final heating to 100° C. for 3 hours. The product weighed 3.95 grams and contained 88.7% tetramethyl ammonium borohydride.

*Example 7*

Tetramethyl ammonium phosphate was prepared by titration of a 10% aqueous solution of tetramethyl ammonium hydroxide with a calculated amount of a standard aqueous solution of phosphoric acid. 83 cc. of 1.15 molar solution of tetramethyl ammonium phosphate was evaporated under vacuum at room temperature to a volume of 38 cc. This solution was mixed with an aqueous solution containing 3.79 grams of 95% sodium borohydride and a minimum amount of water. The mixture was filtered at between 0° C. and 2° C. and the filtrate evaporated to dryness under vacuum with a final heating at 100° C. for 3 hours. The product weighed 4 grams and contained 90% tetramethyl ammonium borohydride.

*Example 8*

An aqueous solution containing 0.707 gram of sodium borohydride and a minimum amount of water was added to 36 grams of 92.5% ethyl alcohol containing 1.95 grams of tetramethyl ammonium chloride. The mixture was filtered and the filtrate evaporated to dryness under vacuum with a final heating at 70° C. for 3 hours. The product weighed 1.67 grams and contained 72.3% tetramethyl ammonium borohydride.

*Example 9*

An aqueous solution containing 1.668 grams of 98.2% lithium borohydride was added to 115 cc. of 0.658 molar aqueous solution of tetraethyl ammonium fluoride (prepared similarly to tetramethyl ammonium fluoride as described in Example 4). The mixture was filtered and the filtrate evaporated to dryness under vacuum with a final heating at 100° C. for 3 hours. The product weighed 8.93 grams and contained 94.5% tetraethyl ammonium borohydride. The tetraethyl ammonium borohydride is a white powder and has density of 0.927 gram per cc.

*Example 10*

An aqueous solution containing 1.14 grams of 98.2% lithium borohydride was added to 113 cc. of 0.453 molar aqueous solution of trimethylbenzyl ammonium fluoride (prepared similarly to tetramethyl ammonium fluoride as described in Example 4). The solution was evaporated to a volume of 30 cc. and filtered. The filtrate was evaporated to dryness under vacuum with a final heating at 100° C. for 3 hours. The product weighed 8.58 grams and contained 88% trimethylbenzyl ammonium borohydride. The product is a white powder with a slight yellow cast.

Example 11

4.2 grams of sodium borohydride and 17 grams of tetramethyl ammonium bromide were dissolved in a flask with 50 cc. of distilled water and evaporated dry at room temperature under vacuum. The solid was vacuum dried for 15 hours and then extracted with 100 cc. of 95% ethyl alcohol for one hour. It then was filtered and washed with 80 cc. of ethyl alcohol and vacuum dried. Analysis showed the product contained 39% tetramethyl ammonium borohydride.

The quaternary ammonium borohydrides produced by the invention are useful as a source of hydrogen, as a fuel, as reducing agents for organic compounds, such as aldehydes, etc.

We claim:

1. A method for the preparation of tetramethylammonium borohydride which comprises mixing a tetramethylammonium halide and an alkali metal borohydride in an aqueous alcoholic medium and recovering the product.

2. A method for the preparation of tetramethylammonium borohydride which comprises mixing a tetramethylammonium halide and an alkali metal borohydride in an inert liquid organic amine and recovering the product.

3. In a method for producing a quaternary ammonium borohydride, the step which comprises dissolving in a common solvent an alkali metal borohydride and a quaternary ammonium compound selected from the group consisting of tetraalkyl, tetraalkaryl, allyltrimethyl, (2-cyclohexyl-ethyl)-trimethyl, (2-chloroethyl)-trimethyl, (2-hydroxybutyl)-trimethyl, (2-ethoxypropyl)-trimethyl, alpha-amino-p-tolyl trimethyl, (3-cyanopropyl) trimethyl and (2-carboxyethyl) trimethyl ammonium hydroxides and salts thereby forming a reaction liquor comprising said solvent, a borohydride corresponding to said quaternary compound and an alkali metal compound selected from the group consisting of hydroxides and salts.

4. In a method for producing a tetraalkylammonium borohydride, the step which comprises dissolving in a common solvent an alkali metal borohydride and a tetraalkylammonium salt thereby forming a reaction liquor comprising said solvent, said tetraalkylammonium borohydride and an alkali metal salt.

5. The method of claim 4 wherein said tetraalkylammonium salt is a tetramethylammonium salt.

6. The method of claim 4 wherein said tetraalkylammonium salt is a tetraethylammonium salt.

7. The method of claim 4 wherein the tetraalkylammonium salt is a halide.

8. The method of claim 4 wherein said solvent is water.

9. The method of claim 4 wherein said solvent is aqueous alcohol.

10. The method of claim 4 wherein said solvent is an inert liquid organic amine.

11. In a method for producing a tetraalkylammonium borohydride, the step which comprises dissolving in a common solvent an alkali metal borohydride and a tetraalkylammonium hydroxide thereby forming a reaction liquor comprising said solvent, said tetraalkylammonium borohydride and an alkali metal hydroxide.

12. The method of claim 11 wherein the tetraalkylammonium hydroxide is tetramethylammonium hydroxide.

13. The method of claim 11 wherein said solvent is water.

14. The method of claim 11 wherein the solvent is aqueous alcohol.

15. In a method for producing a tetraalkarylammonium borohydride, the step which comprises dissolving in a common solvent an alkali metal borohydride and a tetraalkarylammonium salt thereby forming a reaction liquor comprising said solvent, said tetraalkarylammonium borohydride and an alkali metal salt.

16. The method of claim 15 wherein the tetraalkarylammonium salt is a halide.

17. In a method for producing a tetraalkarylammonium borohydride, the step which comprises dissolving in a common solvent an alkali metal borohydride and a tetraalkarylammonium hydroxide thereby forming a reaction liquor comprising said solvent, said tetraalkarylammonium borohydride and an alkali metal hydroxide.

18. The method of claim 15 wherein the tetraalkarylammonium salt is a benzyltrimethylammonium salt.

References Cited in the file of this patent

UNITED STATES PATENTS

| | | |
|---|---|---|
| 2,234,581 | Rosen | Mar. 11, 1941 |
| 2,461,661 | Schlesinger et al. | Feb. 15, 1949 |

OTHER REFERENCES

Schaffer et al.: "J. Am. Chem. Soc.," vol. 71 (1949), pp. 2143–45.